United States Patent
Hashimoto (10) Patent No.: US 8,556,718 B2
(45) Date of Patent: Oct. 15, 2013

(54) GAME MACHINE AND MOVEMENT CONTROL METHOD OF CHARACTER

(75) Inventor: Yoshihisa Hashimoto, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 60 days.

(21) Appl. No.: 12/990,351

(22) PCT Filed: Apr. 28, 2009

(86) PCT No.: PCT/JP2009/058321
§ 371 (c)(1),
(2), (4) Date: Oct. 29, 2010

(87) PCT Pub. No.: WO2009/133872
PCT Pub. Date: Nov. 5, 2009

(65) Prior Publication Data
US 2011/0039620 A1 Feb. 17, 2011

(30) Foreign Application Priority Data

Apr. 30, 2008 (JP) .................................. 2008-119347

(51) Int. Cl.
*A63F 13/00* (2006.01)
*A63F 9/24* (2006.01)

(52) U.S. Cl.
USPC .............. 463/36; 463/1; 463/5; 463/6; 463/7; 463/33

(58) Field of Classification Search
USPC ...................................... 463/1, 5, 6, 7, 33, 36
See application file for complete search history.

(56) References Cited

U.S. PATENT DOCUMENTS

| | | | |
|---|---|---|---|
| 4,300,770 A * | 11/1981 | Knetzger | 273/238 |
| 6,602,136 B1 * | 8/2003 | Baerlocher et al. | 463/16 |
| 6,761,633 B2 * | 7/2004 | Riendeau et al. | 463/16 |
| 7,367,887 B2 * | 5/2008 | Watabe et al. | 463/36 |

(Continued)

FOREIGN PATENT DOCUMENTS

| | | | |
|---|---|---|---|
| JP | 2000-126457 A | 5/2000 | |
| JP | 2001-149653 A | 6/2001 | |

(Continued)

*Primary Examiner* — Dmitry Suhol
*Assistant Examiner* — Ryan Hsu
(74) *Attorney, Agent, or Firm* — Dickstein Shapiro LLP (57) ABSTRACT

In a game where a character is moved at a high speed to a goal along a path that is set in a virtual three-dimensional space, an operation mistake is better prevented in a movement operation of the character. A plurality of paths where the character moves are set in parallel in the virtual three-dimensional space. Game control means includes path information storing means for storing a coordinate position and a directional vector that are given to each point of a sequence of points arranged in each of the paths. Additionally, the position coordinate of the character moving in one of the paths is calculated based on the information stored in the path information storing means. A game machine includes a special movement process means for moving, when a special movement input signal is input from a controller pad operated by a player, the character from the path where the character is currently moving to a position coordinate in the virtual three-dimensional space of an adjacent path, by referring to position coordinates of the sequence of points stored in the path information storing means.

6 Claims, 6 Drawing Sheets

(56) References Cited

U.S. PATENT DOCUMENTS

| | | |
|---|---|---|
| 7,713,126 B2 * | 5/2010 | Suzuki et al. .................. 463/31 |
| 8,057,290 B2 * | 11/2011 | Vance et al. ..................... 463/7 |
| 2002/0075264 A1 | 6/2002 | Iizuka et al. |
| 2002/0160823 A1 * | 10/2002 | Watabe et al. ..................... 463/7 |
| 2007/0010325 A1 * | 1/2007 | Suzuki et al. .................. 463/31 |
| 2007/0265087 A1 | 11/2007 | Akahori et al. |
| 2008/0139307 A1 | 6/2008 | Ueshima et al. |
| 2011/0034247 A1 * | 2/2011 | Masuda et al. .................. 463/35 |

FOREIGN PATENT DOCUMENTS

| | | |
|---|---|---|
| JP | 2006-320707 A | 11/2006 |
| JP | 3937179 B2 | 6/2007 |
| JP | 2007-301040 A | 11/2007 |

* cited by examiner

GAME MACHINE AND MOVEMENT CONTROL METHOD OF CHARACTER

TECHNICAL FIELD

The present invention relates to a game machine, and more particularly, to a game machine that allows enjoying an action game while moving a character along movement routes that are set in a virtual three-dimensional space based on an operation signal from a controller pad operated by a player, and to a movement control method of the character.

BACKGROUND ART

In a game machine that allows enjoying an action-type game, the game advances by controlling the images relating to motions of actions and movement of a player character (hereinafter simply referred to as "the character"), which serves as a lead character in the game displayed on a screen of a display device, in accordance with a program process, based on an operation signal (hereinafter referred to as an operation input signal) from a controller pad (controller) operated by a player. In such an action-type game, in order to enhance the dramatic impact of the game, game video picture (images) where the character acts is generally provided in three-dimensional graphics.

In the three-dimensional graphics, based on three-dimensional data representing video pictures of various objects, the three-dimensional position relationship of the objects in an eye direction from a point of view in the virtual three-dimensional space is calculated, and the objects are represented in three-dimensional video picture by performing a rendering process.

Additionally, in the action-type game, the movement of the character or the paths of the movement in the virtual three-dimensional space is controlled based on the operation input signal from the controller pad operated by the player. As for such technologies, for example, the technologies described in the following patent documents have been proposed.

Japanese Laid-Open Patent Application No. 2001-149653 (Patent Document 1) proposes a game machine that sets a plurality of event positions in a three-dimensional space for producing events in the game and a plurality of movement paths connecting the event positions to each other, and includes movement process means for moving a point of view corresponding to a player along the movement paths, selected image displaying for displaying predetermined option images corresponding to the movement paths that can be taken next at an event position, and a pointing device for selecting one of the option images displayed by the selected image displaying means.

Japanese Patent Publication No. 3937179 (Patent Document 2) proposes a game machine including input control means for detecting an operation input from a player, position coordinate storing means for storing a position coordinate of a character in a virtual three-dimensional space, path information storing means for storing, as point data, a directional vector and the position coordinate given to each point of a sequence of points arranged in the virtual three-dimensional space, movement instruction direction obtaining means for specifying the point data positioned closest to the position coordinate of the character in the virtual three-dimensional space, and obtains the directional vector given to the specified point data, and position coordinate calculating means for moving, when the operation input from the player is detected by the input control means, the position coordinate of the character in the virtual three-dimensional space toward a direction of the directional vector obtained by the movement instruction direction obtaining means.

DISCLOSURE OF THE INVENTION

The game machine described in Patent Document 1 displays, on an event screen, to the player, when the movement paths of the character branch off, the predetermined option images corresponding to the movement paths that can be taken next by the character. Additionally, it is the game machine that enables the player to select desired movement paths by shooting the option images by using a gun-shaped controller (pointing device). Accordingly, the game machine described in Patent Document 1 does not arrange a plurality of paths in parallel in which the character moves, and control advancement of the game by moving the character to another path arranged in parallel based on an operation of the controller by the player.

The game machine described in Patent Document 2 includes the position coordinate calculating means for moving, when an operation input signal from the player is detected, if the position coordinate of the character is within a specific section, the position coordinate of the character in the virtual three-dimensional space in the direction of the directional vector obtained by the movement instruction direction obtaining means. However, one path is set for the character to move in. Accordingly, it does not include means for moving, when the operation input signal from the controller pad operated by the player is detected, the character to another path of a plurality of paths that are set in parallel.

Additionally, in the game machine described in the above-mentioned Patent Document 2, about one path is set in the virtual three-dimensional space in which the character moves, and a path region is set for the path that allows the player character to move in a planar direction, such as a vertical direction or a horizontal direction. In the game where one path is set in the virtual three-dimensional space, and the character is moved at a high speed in the path region based on the operation of the controller pad by the player, the player can enjoy the game by speedy representation of the space or the like where movement is made in each path region by high-speed movement. However, though the movement in the virtual space by an input using a direction instruction key enables delicate movement, it is not always possible for the player to accurately input a movement. Hence, in an attempt to move the character at a high speed, the player may make an error in operating the direction instruction key of the controller pad: for example, the character may fall into a hole provided in each path region of the virtual space; and the character may contact an enemy character or an obstacle that is set in each path, and may be damaged. Thus, it becomes impossible to clear a stage of the game. As a result, the player's mood has often been spoiled. In order to deal with the problem, it is possible to provide means for moving the player character from the path region where the player character currently exists to a different region as an emergency escape, thereby preventing spoiling the mood of the player.

Therefore, an object of the present invention is to provide a game machine that sets a plurality of paths in parallel in the virtual three-dimensional space, includes usual movement input means operated by the player, and further includes means for allowing the character, which is operated by the player, to move between paths based on the operation input, thereby improving the above-mentioned conventional defects of games.

The present invention is a game machine including game control means for controlling, based on an operation input signal from input operation means operated by a player, a character to move along a path that is set in a virtual three-dimensional space, the path being formed by a plurality of paths that are set in parallel in the virtual three-dimensional space, the game control means comprising:

path information storing means for storing a position coordinate and a directional vector that are given to each point of a sequence of points arranged in each of the paths;

character position coordinate storing means for calculating, based on the position coordinate and the directional vector stored in the path information storing means, a position coordinate of the character moving in one of the paths, and for storing the position coordinate; and special movement process means for moving, based on a special movement input signal of the operation input signal, a position of the character moving in the path to a position coordinate in the virtual three-dimensional space of a path adjacent to the path where the character is moving, by referring to position coordinates of the sequence of points stored in the path information storing means.

Additionally, in the game machine according to the present invention, the special movement input signal includes a direction type signal for moving the character moving in the path to one of adjacent paths that are set in parallel to the path, and the special movement process means includes means for moving, based on the direction type signal, the position of the character moving in the path to a position coordinate in a path that is set to right adjacent or left adjacent to the path.

Further, in the game machine according to the present invention, the input operation means includes means for outputting a normal movement input signal including information relating to a direction and a stroke amount as the operation input signal, and the control means includes normal movement process means for moving the position of the character moving in the path to a position coordinate in the virtual three-dimensional space calculated based on the information relating to the direction and the stroke amount that are input as the normal movement input signal.

In addition, the present invention is a movement control method of a character for controlling a movement of the character in a virtual three-dimensional space in a game, the game including:

game control means for controlling, based on an operation input signal that is input from input operation means operated by a player, an operation of a game machine that moves a character along one of a plurality of paths that are set in a virtual three-dimensional space;

character position coordinate storing means for storing a position coordinate of the character moving in one of the paths; and path information storing means for storing a position coordinate and a directional vector that are given to each point of a sequence of points arranged in each of the paths, in the game, the movement control method of the character comprising:

an input signal analysis step for, when the operation input signal is input from the input operation means, analyzing a type of the input operation input signal; and a special movement process step for moving, based on the type of the operation input signal analyzed by the input signal analysis step, a position of the character moving in the path to a position coordinate in the virtual three-dimensional space of a path adjacent to the path where the character is moving, by referring to position coordinates of the sequence of points stored in the path information storing means.

Additionally, in the movement control method of the character according to the present invention, when the input signal analysis step analyzes that the type of the operation input signal is a direction type signal for moving the character moving in the path to one of adjacent paths that are set in parallel to the path, the special movement process step includes a step for moving, based on the direction type signal, the position of the character moving in the path to a position coordinate in the virtual three-dimensional space of a path that is right adjacent or left adjacent to the path.

Further, in the movement control method of the character according to the present invention, the input operation means includes means for outputting a normal movement input signal including information relating to a direction and a stroke amount as the operation input signal, and the movement control method of the character further comprises a normal movement process step for moving, when the input signal analysis step analyzes that the normal movement input signal is input, the position of the character moving in the path to a position coordinate in the virtual three-dimensional space calculated based on the information relating to the direction and the stroke amount that are input.

The present invention includes means for setting a plurality of paths in parallel in the virtual three-dimensional space, and allowing the character operated by the player to move in the region of each path based on the operation input signal, and also allowing the character to move between different paths. In this manner, while the player is moving the character at a high speed in the path that is set in the three-dimensional space, when the player finds that an obstacle or a hole in a direction of movement (in a direction for reaching a goal, which is a destination of the player), the player can operate the controller pad so as to avoid the obstacle or the hole in the region of each path, and can perform a special movement operation for immediately moving the character to an adjacent path. Hence, it is possible to reduce occurrence of operation mistakes by the player as much as possible. Further, by repeatedly operating this special movement function, it is possible to enhance amusement that the player can move the character at a high speed toward the goal, while enjoying thrill of changing the paths (courses).

BEST MODE FOR CARRYING OUT THE INVENTION

Hereinafter, the best mode for implementing the present invention will be described with reference to the drawings. In embodiments of the present invention, a description will be given by taking as an example a game in which a character advances, based on an operation input signal from a controller pad operated by a player, along one of a plurality of paths (movement routes) arranged in parallel in a virtual three-dimensional space, and, for example, battles with an enemy character emerging in a path region, and advances toward a goal while avoiding an obstacle that is set in the path region. Additionally, the present invention includes means that can move, based on the operation input signal from the controller pad operated by the player, the character moving in one of the paths arranged in parallel in the virtual three-dimensional space from the current path to a different path (course change)

Figure 1:
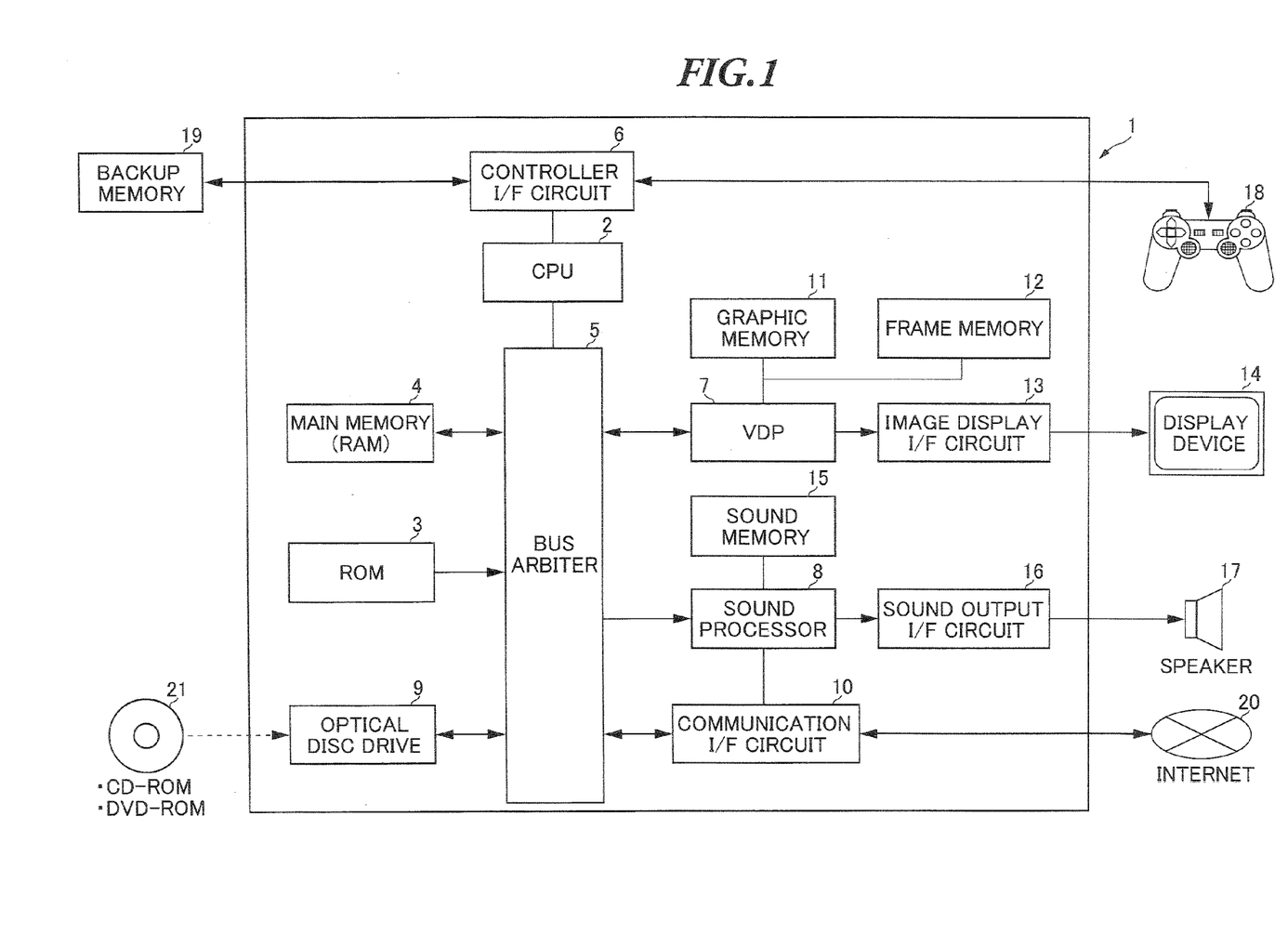
FIG. 1 is a diagram showing an exemplary structure of a game machine according to an embodiment of the present invention.

FIG. 1 is a diagram showing an exemplary structure of a game machine according to the present invention that includes control means 1 for controlling advancement of a game, various input/output devices connected to the control means 1, and the like.

The control means 1 is formed by a control substrate mounting thereon a CPU 2, various ICs, interface (I/F) circuits, and the like. The CPU 2 is a central processing unit that interprets programs stored in a ROM 3 and a RAM (main memory) 4, and controls an operation of the game machine. The CPU 2 is connected to the RAM 4, a bus arbiter 5, and a controller I/F circuit 6 via bus lines. Additionally, when a power source of the game machine is turned on, a boot program stored in the ROM 3 is executed.

The bus arbiter 5 is connected to a video display processor (VDP) 7, a sound processor 8, an optical disc drive 9, and a communication I/F circuit 10. It should be noted that the bus arbiter 5 is a circuit for controlling, in response to a use request of bus lines from a plurality of CPUs connected to the same bus lines, such as the video display processor 7 and the sound processor 8, granting of citizenship of the bus lines.

The video display processor 7 is connected to a graphic memory 11 and a frame memory 12. Additionally, the video display processor 7 is connected to, via an image display I/F circuit 13, a display device 14 formed by a liquid crystal panel for displaying an effected image of the game. Further, the sound processor 8 is connected to a sound memory 15, and is also connected to, via a sound output I/F circuit 16, a speaker 17 for outputting sound.

The video display processor 7 reads out image data stored in the graphic memory 11, performs various image processing, and calculates and generates image data for effected display in a three-dimensional space, based on data and instructions from the CPU2 in accordance with control by an application (game control) program (three-dimensional space setting process). The generated image data for effected display is displayed on the display device 14 via the image display I/F circuit 13 as the effected image. It should be noted that the generated image data for effected display may be processed such that the image data is written to the frame memory 12 as frame data, and is read out in frames at predetermined timings and displayed on the display device 14.

The sound processor 8 reads out sound data stored in the sound memory 15 and performs sound processing based on data and, instructions from the CPU 2 in accordance with control by the application program. The sound data subjected to the sound processing is converted into analog data by the sound output I/F circuit 16, and is output from the speaker 17 as sound or sound effects.

Additionally, the controller I/F circuit 6 is connected to a backup memory 19 and a controller pad 18, which serves as input operation means for operating movement of a character or the like by a player. The backup memory 19 is storing means for storing, when the player shuts down the game and turns off the power source of the game machine, a game condition until then. For example, a memory card or the like is used as the backup memory 19.

The communication I/F circuit 10 performs data communication with an external Web server or the like via, for example, the Internet 20.

When the player inserts, into the optical disc drive 9, a CD-ROM (or a DVD-ROM) 21 that stores an application program or the like for performing an action-type game according to the present invention, and turns ON the power source of the game machine, the CPU 2 executes the boot program stored in the ROM 3 mentioned above. The boot program reads an OS stored in the CD-ROM 21 into the RAM 4, and the CPU 2 controls execution of the OS that is loaded into the RAM 4.

Upon execution of the OS loaded into the RAM 4, in accordance with control by the OS, a startup process program Pie (refer to FIG. 2) is activated, and loads, into the RAM 4, various kinds of information and the application (game control) program stored in the CD-ROM 21. Further, the startup process program P1a loads, into the graphic memory 11, image data stored in the CD-ROM 21, and also loads, into the sound memory 15, sound data stored in the CD-ROM 21 as well. In this manner, by input of a game start signal from the controller pad 18 operated by the player, the game machine can execute the application program of the game.

Figure 2:
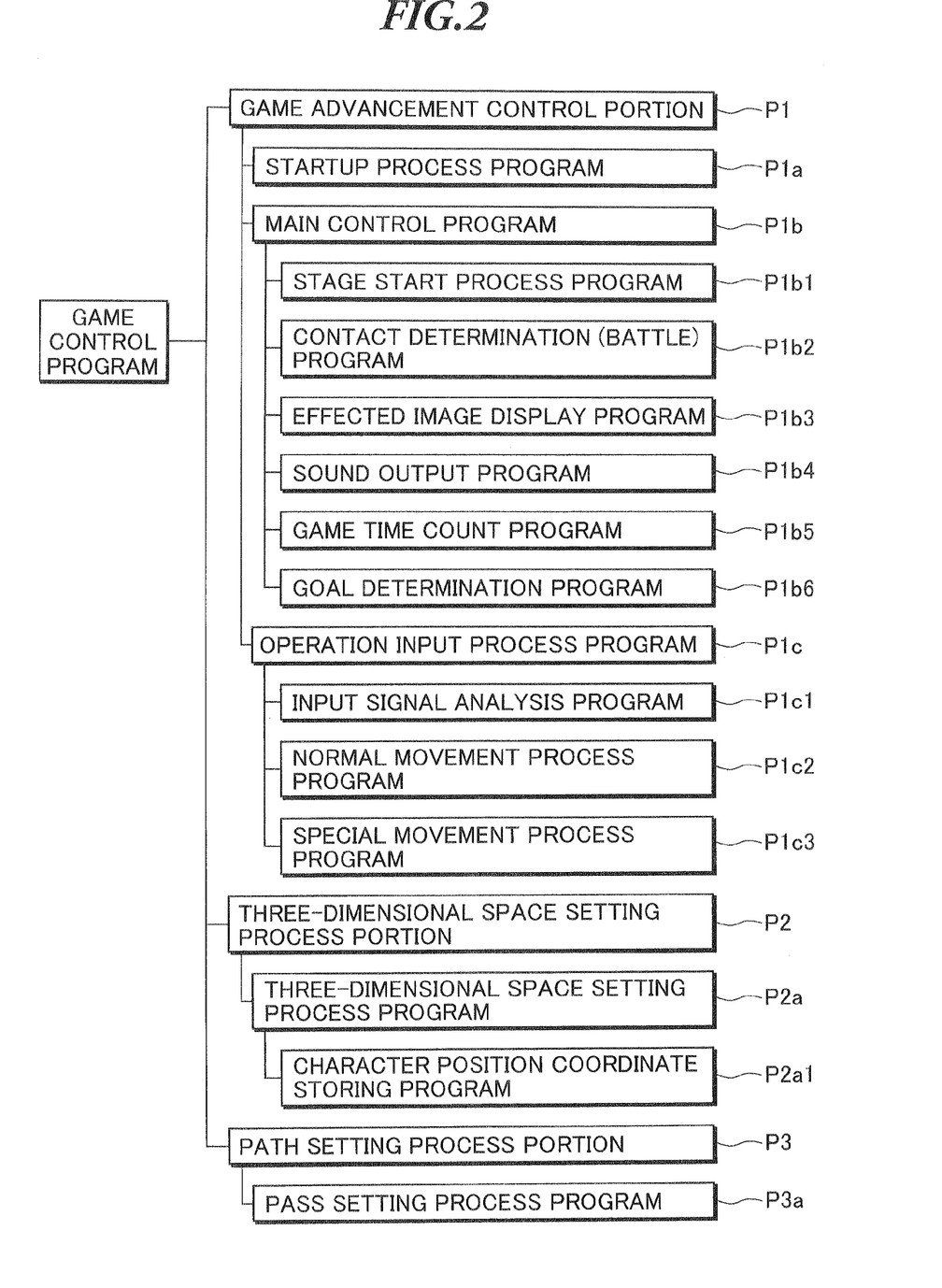
FIG. 2 is a diagram for explaining a structure of a program, which is a game control program controlling an operation of the game machine shown in FIG. 1.

Subsequently, a description will be given of an exemplary structure of the application (game control) program that is loaded into the RAM 4 from the CD-ROM 21 and executed. FIG. 2 is a diagram showing an exemplary structure of the game control program, which serves as game control means.

As shown in FIG. 2, the game control program is formed by each program included in a game advancement control portion P1, a three-dimensional space setting process portion P2, and a path setting process portion P3. The game advancement control portion P1 is formed by programs for controlling advancement of the game, and mainly formed by the startup process program P1a that performs a startup process of the game control program when the power source of the game machine is turned on, a main control program P1b that unifies and controls the advancement of the game, an operation input process program P1c, and the like.

Further, the main control program P1b includes, as subprograms, a stage start process program P1b1, a contact determination (battle) program P1b2, an effected image display program P1b3, a sound output program P1b4, a game time count program P1b5, a goal determination program P1b6, and the like.

Additionally, the operation input process program P1c performs a process on the operation input signal that is input from the controller pad 18 operated by the player, and includes an input signal analysis program P1c1, a normal movement process program P1c2, which serves as normal movement process means, and a special movement process program P1c3, which serves as special movement process means. Further, the input signal analysis program P1c1 analyzes a type of the operation input signal that is input from the controller pad 18. A description will be given later of the normal movement process program P1c2 and the special movement process program P1c3.

The three-dimensional space setting process portion P2 includes a three-dimensional space setting process program P2a that outputs a drawing instruction to the video display processor 7 based on the operation signal obtained by operating the controller pad 18 by the player, and map information stored in the RAM 4, such as position data of the plurality of paths, polygon data for displaying the character and the various obstacles, and position data of point of view for generating an image for effects. Further, the three-dimensional space setting process program P2a includes a character position coordinate storing program P2a1. The character position coordinate storing program P2a1 obtains a position coordinate of the character in a current virtual three-dimensional space by calculation, and stores the position coordinate in the RAM 4. The character position coordinate storing program P2a1 and the position coordinate of the character stored in the RAM 4 serve as character position coordinate storing means.

Figure 3:
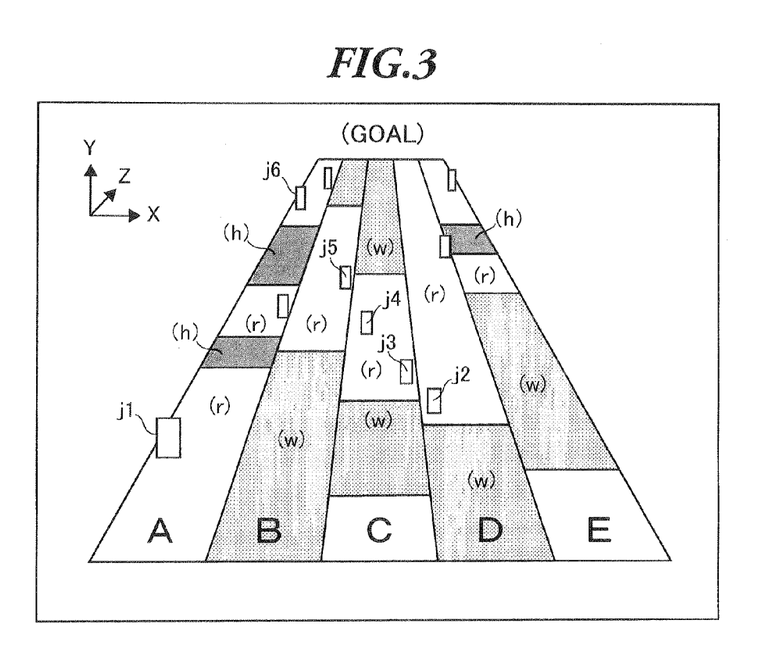
FIG. 3 is a diagram showing an exemplary display of an image of a virtual three-dimensional space that is generated by the game machine according to the present invention.

FIG. 3 shows an example of an image for game effects in the virtual three-dimensional space that is created by an instruction from the three-dimensional space setting process program P2a. In the example shown in FIG. 3, as for a plurality of paths, five paths (A), (B), (C), (D) and (E) are set in parallel in the virtual three-dimensional space. It should be noted that these paths (A), (B), (C), (D) and (E) represent movement routes where the character moves. In the present embodiment, the character position coordinate storing program P2a1 obtains a current position coordinate of the character by calculation, when the character is moving in one of the paths, for example, moving toward a goal while avoiding an obstacle j1 and the like, based on the operation input signal from the controller pad 18 operated by the player.

Additionally, the character position coordinate storing program P2a1 stores, in the RAM 4, the obtained position coordinate of the character.

Further, as shown in FIG. 3, for example, a plate-like portion (r) indicating a ground, a hole (h) set in the plate-like portion, a water-surface-like portion (w) and the like are provided in a region of each of the paths that are set in the virtual three-dimensional space. In addition, obstacles j1, j2, ... built with three-dimensional shapes or the like are arranged on the plate-like portion (r) in the regions of the paths, such that the paths set in the virtual three-dimensional space become varied paths. It should be noted that the number of the paths is not limited to five. Further, the plurality of paths that are set in the virtual three-dimensional space may be set to include portions from which the paths branch off or at which the paths meet, so as to increase or decrease the number of the paths.

The path setting process portion P3 shown in FIG. 2 includes a pass setting process program P3a for setting path information to the path where the character moves, positions and shapes of the obstacles, and shapes of the plurality of paths (A), (B), (C), (D), (E) and the like in the virtual three-dimensional space that are set in the virtual three-dimensional space mentioned above. The path information includes a sequence of points arranged for each of these paths that are set in the virtual three-dimensional space, a position coordinate and a directional vector that are given to each of the sequence of points, and region width information corresponding to the path. Additionally, the path information is stored in path information storing means that is set in a predetermined memory area of the RAM 4, such that the path information corresponds to identification information of the plurality of paths (A), (B), (C), (D), (E) and the like.

Figure 4:
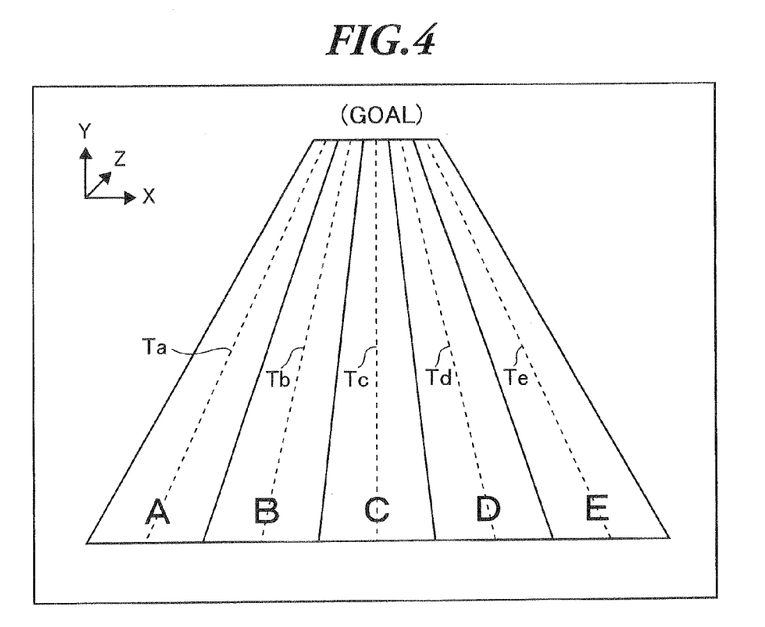
FIG. 4 is a diagram for explaining, when path information is set in the virtual three-dimensional space shown in FIG. 3, a setting position of the path information.
Figure 5:
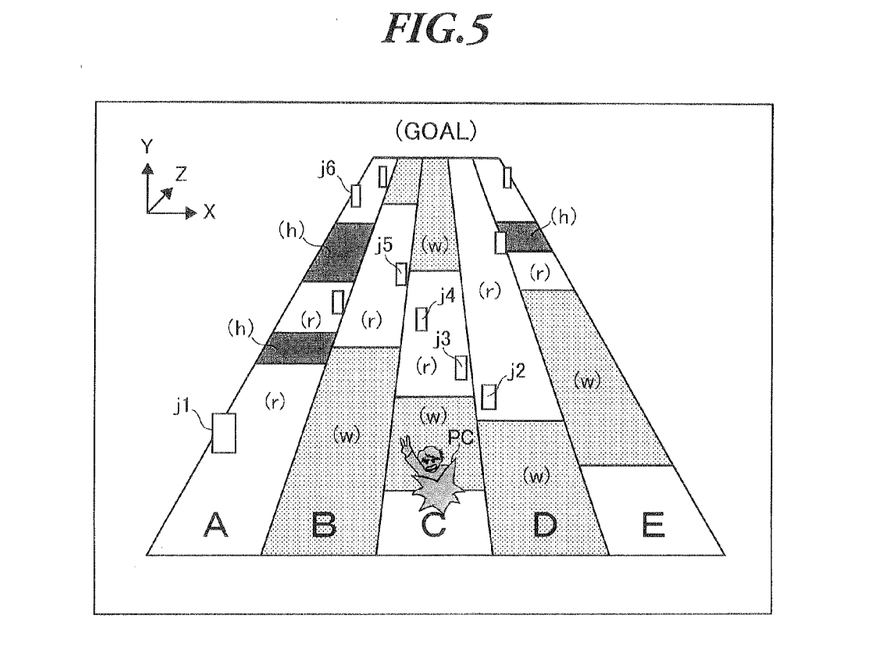
FIG. 5 is a diagram showing an exemplary display when an image of a character is displayed in the virtual three-dimensional space shown in FIG. 3.

When the pass setting process program P3a sends, to the video display processor 7, a setting instruction of the path information together with the path information, the video display processor 7 generates, as shown in FIG. 4, image information that represents a virtual three-dimensional space where the path information formed by sequences of points Ta, Tb, Tc, Td and Te is set for the five paths (A), (B), (C), (D) and (E), respectively. Further, when starting the game, the character position coordinate storing program P2a1 displays, as shown in FIG. 5, for example, an image of a character PC at a start position of the path (C).

Figure 6:
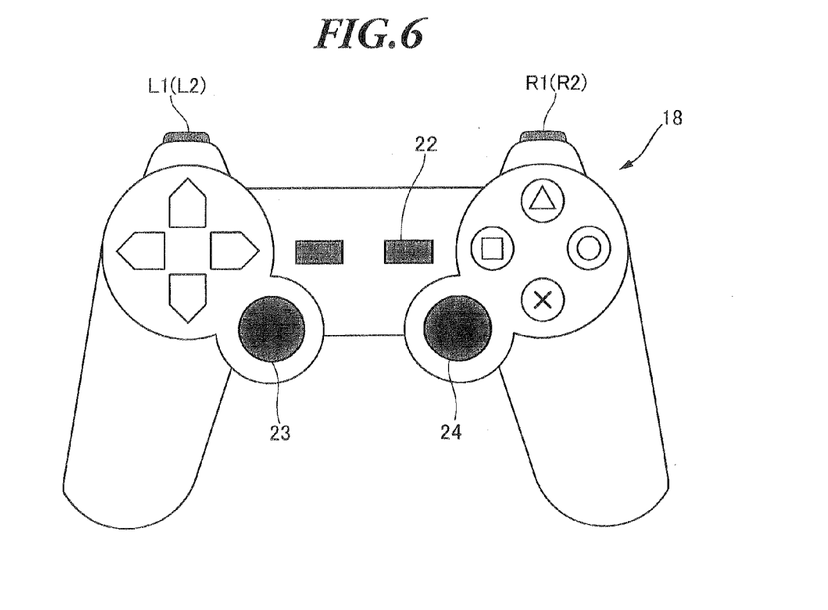
FIG. 6 is a diagram for explaining an example of a controller pad that is used in the game machine according to the present invention.

FIG. 6 is a plan view showing an appearance of the controller pad 18, which can be used for the game machine according to the present invention. The controller pad 18 serves as the input operation means for the game machine that has been widely used conventionally. The controller pad 18 is provided with a game start button 22, levers 23 and 24, and various kinds of push buttons, such as push buttons L1 and L2 arranged on the left side of the plane of paper, and push buttons R1, R2, ..., a ○ button, a △ button and the like arranged on the right side thereof. It should be noted that the push button L2 is arranged below the push button L1. Similarly, the push button R2 is arranged below the push button R1.

In the present game machine, the lever 23 or 24 serves as input means for normal movement described below that outputs a normal movement input signal. Additionally, the push buttons L1 and R1 serve as input means for special movement that output special movement input signals. However, the input means for generating the operation input signals relating to the normal movement and the special movement is not limited to these levers and the push buttons.

Further, the levers 23 and 24 can output, in analog values, tilts (stroke amounts) of the levers with respect to an X-Y surface. Additionally, when the player moves the lever 23 or 24 to a forward direction (a positive direction of a Y axis, which is a goal direction), the character PC moves in the positive direction of the Y axis in the virtual three-dimensional space while increasing speed. In the present game machine, the law of inertia applies in the virtual three-dimensional space, and when the increasing of the speed is started, the character PC is moved while increasing the speed up to a maximum speed that is set to the character PC. Further, when the lever 23 or 24 is moved to a right direction, the character PC moves to a positive direction of an X axis in the virtual three-dimensional space while increasing the speed, and when the lever 23 or 24 is moved to a left direction, the character PC moves to a negative direction of the X axis in the virtual three-dimensional space while increasing the speed. In the movement of this case, as long as it is a region that is set to allow movement, the character PC can move in the virtual three-dimensional space independently of a path to which a current position is set or of the path region of the path. For example, when movement is made to the right direction from within a region that is currently set to be the path (C), it is possible to move from the region of the path (C) into the region of the path (D). In this manner, it is also possible to reach the goal while avoiding the obstacles only by the normal movement, as in a general action game that conventionally exists.

Figure 7:
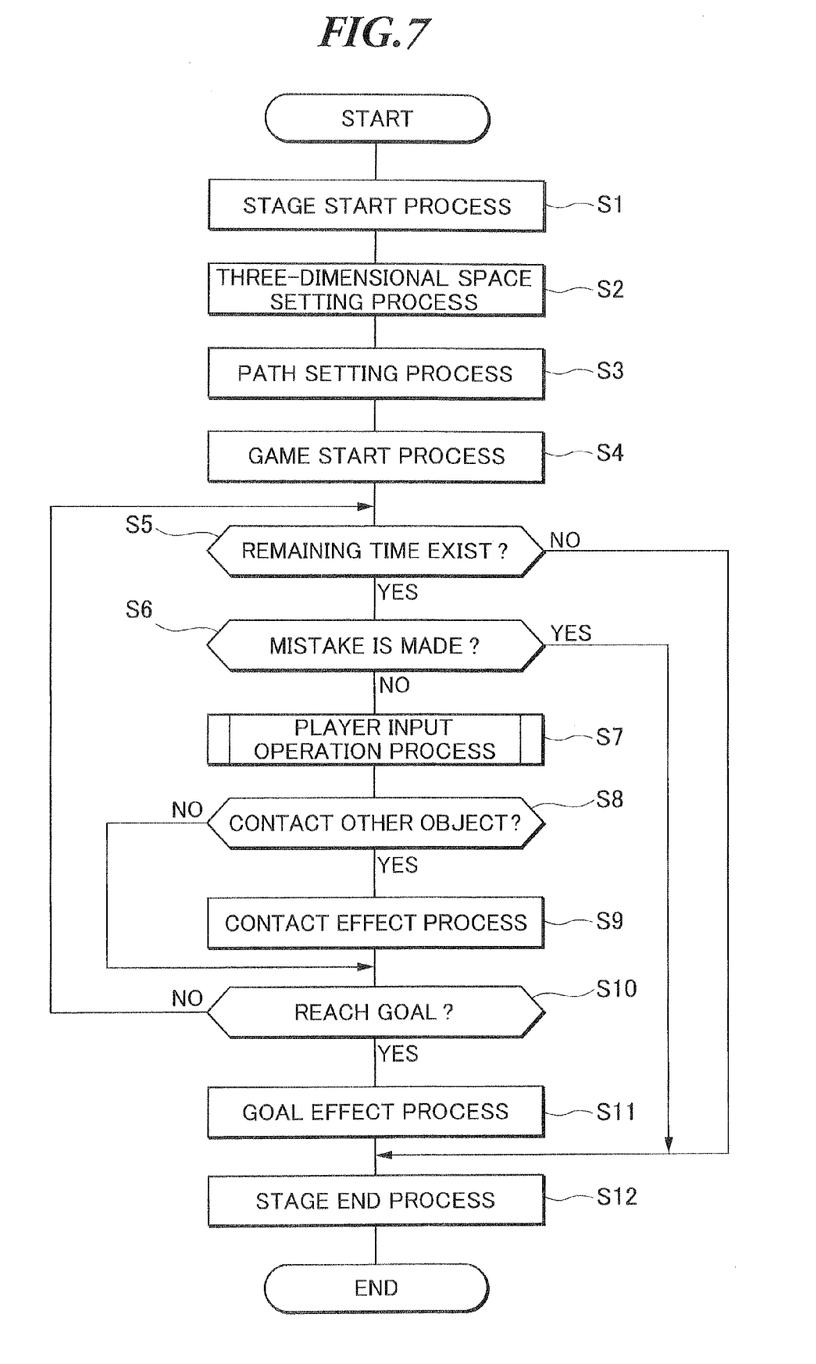
FIG. 7 is a flow chart for explaining a procedure for controlling advancement of a game by a main control program shown in FIG. 2.
Figure 8:
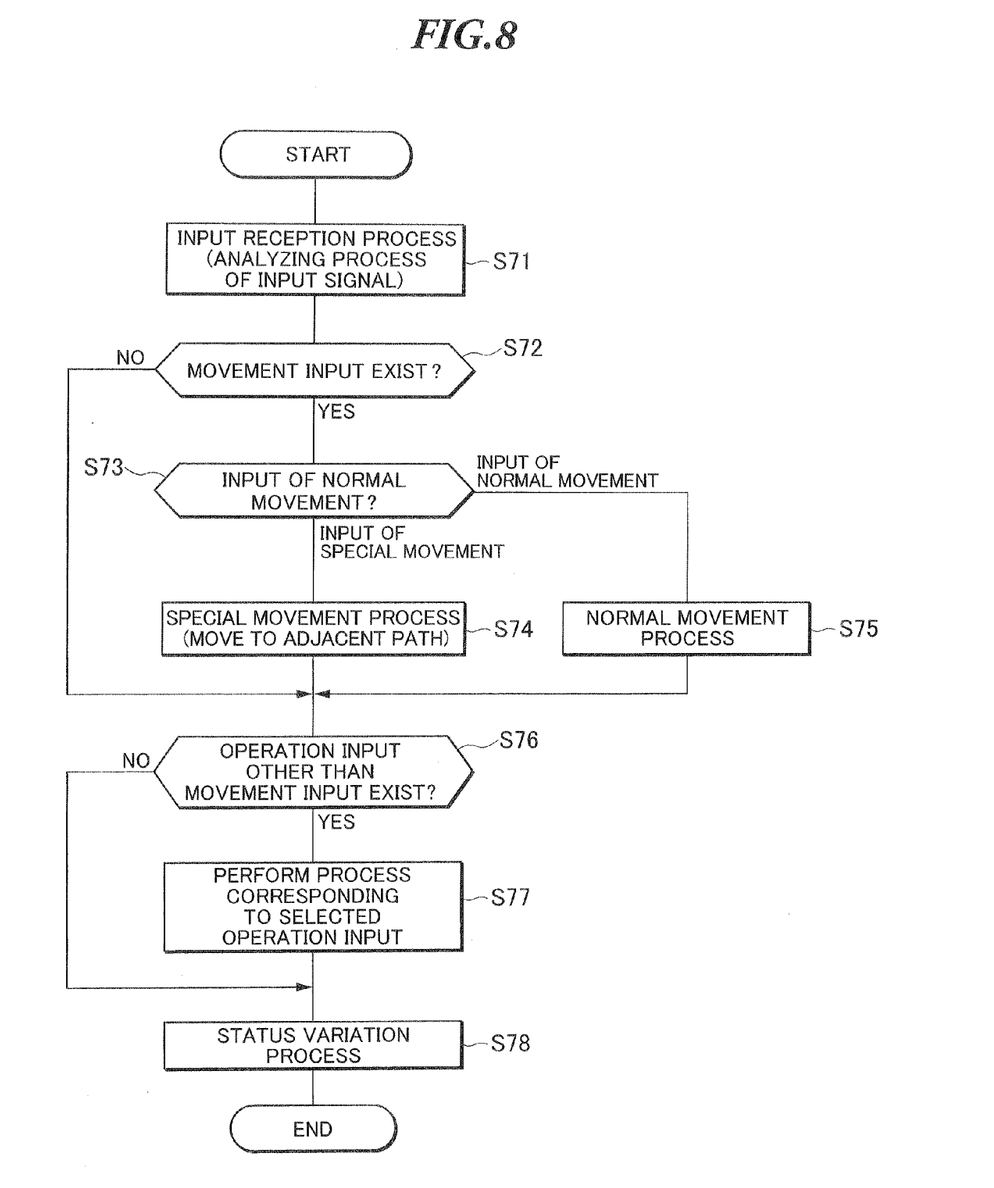
FIG. 8 is also a flow chart for explaining a procedure for controlling the advancement of the game by the main control program shown in FIG. 2.

Subsequently, a description will be given of an example of a procedure for controlling the advancement of the game in the game machine according to the present invention, based on flow charts shown in FIGS. 7 and 8. FIG. 7 shows a procedure for controlling the advancement of the game for one stage based on the control by the main control program P1b shown in FIG. 2, when the player plays the game. Hereinafter, a description will be given of the procedure of the control of the game in an order of process steps shown in FIGS. 7 and 8.

(Step S1)

When the above-mentioned process of the startup process program P1a ends and the game control program is loaded into the RAM 4, the main control program. P1b is activated. The main control program P1b activates, as a process for starting a stage, the effected image display program P1b3, thereby displaying on the display device 14 an effected screen at the game start. As for the effected screen at the game start, for example, information relating to how to advance the game is displayed to the player for a predetermined interval of time.

(Step S2)

Subsequently, the three-dimensional space setting process program P2a is activated, and an instruction for generating an image of the virtual three-dimensional space at the time of game start is sent to the video display processor 7. Based on the image generation (drawing) instruction, the video display processor 7 combines an image of the character and the image data of the virtual three-dimensional space stored in the graphics memory 11, so as to generate an image at the time of game start, and displays the generated image on the display device 14. FIG. 5 shows an exemplary display of the image of the virtual three-dimensional space at the time of game start. As shown in FIG. 5, the image of the character PC is positioned at, for example, a coordinate of the start position of the path (c) among the paths (A), (B), (C), (D) and (E) that are set in the virtual three-dimensional space.

(Step S3)

The path setting process program P3 sets, for each of the paths (A), (B), (C), (D) and (E) that are set in the virtual three-dimensional space, the shape in the virtual three-dimensional space, the positions and the shapes of the obstacles, and the path information formed by the sequence of points to a path where the character moves, and stores the set path information in the RAM 4. The paths are formed by, as mentioned above, the sequence of points arranged for each of the paths (A), (B), (C), (D) and (E) that are set in the virtual three-dimensional space, and the directional vector and the position coordinate that are given to each of the sequence of points, and the path region, which is set as the region of the path, is set for each of the paths.

(Step S4)

When the player presses the start button 22 of the controller pad 18, the main control program P1b starts a first stage of the game, and at the same time, activates the game time count program P1b5 to count an elapsed time of the game. Additionally, the elapsed time is stored in the RAM 4. Further, when the game starts, the character position coordinate storing program P2a1 obtains, at predetermined time intervals, among the coordinates of the sequence of points that are set to the path where the character PC is moving, a point closest to a current position coordinate of the character PC. Additionally, at this point, when movement input is being made with respect to a direction of movement, the character PC is moved at a predetermined speed in the direction of the directional vector that is set to the obtained coordinate, and the position coordinate of the moved character PC is stored in the area, which is set in the RAM 4 for storing the position coordinate of the character.

(Step S5)

The game time count program P1b5 determines whether or not the counted elapsed time of the game reaches a predetermined value, e.g., three minutes, in other words, determines whether or not there is a remaining time for the stage of the game. As a result of this determination, when it is determined that the remaining time of the game is "none (0)", advance is made to step S12, and an end process of the game of the stage is performed. On the other hand, when it is determined that the remaining time of the game exists, advance is made to the next step S6.

(Step S6)

The contact determination (battle) program P1b2 determines whether or not the player made a mistake with respect to the advancement of the game. It should be noted that whether or not the mistake is made indicates, for example, that the character PC operated by the player falls into a hole that is set in the virtual three-dimensional space of the region of the path, or that the character PC operated by the player contacts an enemy character or a damage object, which is represented by a flame, a needle or the like, without holding a damage preventing item. Additionally, when the mistake is made, the stage ends by regarding the stage is not cleared, since retiring from the game, such as racing, in the stage is made, i.e., a failure is made. Further, also in step S6, the effected image display program P1b3 is activated to display an effected image of a contact on the display device 14.

(Step S7)

The operation input process program Plc determines whether or not the player operates the controller pad 18, and the operation input signal is input. Then, when it is determined that the operation input signal is input from the controller pad 18, a process corresponding to the operation input signal is performed. FIG. 8 shows a procedure of this step S7 in more detail. Hereinafter, a description will be given of the procedure of step S7 based on FIG. 8.

(Step S71)

The operation input process program Plc determines whether or not the operation input signal is input from the controller pad 18, by checking a storing state of an input port that loads the input signal relating to movement of the character PC from the controller pad 18. As a result of the determination, when it is determined that there is the input signal relating to the movement of the character PC, advancement is made to the next step S73. When it is determined that there is no input signal, advancement is made to step S76.

(Step S73)

The input signal analysis program P1c1 determines whether or not the input signal relating to the movement of the character PC is an input signal relating to the normal movement (an input of the normal movement). Then, when it is determined that the input of the normal movement is made, advancement is made to a normal movement process of step S75. On the other hand, when it is determined that the input of the normal movement is not made, advancement is made to a special movement process of step S74, which is performed by an input of the special movement.

The above-mentioned input of the normal movement indicates a signal (a normal movement input signal) that is input by the player from the lever (stick) 23 or 24 provided in the controller pad 18. It should be noted that a direction of movement (an X-Y direction) and a movement amount (a stroke amount) of the lever are input from the lever (stick) 23 or 24. Additionally, the above-mentioned input of the special movement indicates, for example, an input signal (a special movement input signal) generated by pressing, by the player, either one of the push buttons L1 and R1 provided in the controller pad 18.

(Step S74)

The special movement process program P1c3 executes a process (a special movement process) with respect to the input of the special movement. The special movement process determines a designation path from a current position of the character PC, and moves the character PC to a coordinate of the destination path while maintaining the current movement speed of the character. The movement process of the character PC by the special movement process program P1c3 is described in more detail in the following descriptions of processes (1) through (3)

(1) When the player presses the push button L1 of the controller pad 18, the special movement input signal from the press button L1 is input. Thus, the character PC is moved to a path that is left adjacent to a path region where the character PC is currently moving. In this case, when the path where the character PC is moving is the region of the leftmost path (the path (A) in the example shown in FIG. 3), the character PC is not moved. In this case, an effected image indicating that an operation of the special movement fails may be displayed on the display device 14.

(2) When the player presses the push button R1 of the controller pad 18, the special movement input signal from the press button R1 is input. Thus, the character PC is moved to a path that is right adjacent to a path region where the character PC is currently moving. In this case, when the path where the character PC is moving is the region of the rightmost path (the path (F) in the example shown in FIG. 3), the character PC is not moved. Also in this case, the effected image indicating that the operation of the special movement fails may be displayed on the display device 14.

(3) In the process of the above-mentioned (1) or (2), the process that moves the character PC from the path where the character PC is currently moving to the left adjacent or right adjacent path depending on the type of the input special movement input signal performs a process that moves the character PC from the position coordinate in the current path region to a closest position coordinate among the sequence of points forming the path information that is set to the left adjacent or right adjacent path. Further, the character PC moved to the adjacent path by this process is moved in a direction of the directional vector that is set to the position coordinate to which the character PC is moved.

According to the present invention, by providing the special movement process performed by the operation of the special movement mentioned above, it is possible to exert the following effects.

That is, in the region of the path where the player is performing a movement operation of the character PC, when a strong enemy or an obstacle emerges that is very difficult to avoid by a movement operation by the player, the player immediately presses the push button L1 or the push button R1 so as to move the character PC to an adjacent path where the obstacle or the like does not exist, i.e., the player can change the course. In this manner, it is possible for the player to perform, as an emergency escape, an operation for preventing the character from contacting the obstacle or the like, and to prevent the stage of the game from ending by an operation mistake. Further, by appropriately setting intervals at which these obstacles or enemies are arranged in each region of the paths, it is possible for the player to thrillingly move the character PC to the goal while repeatedly perform the operation of the special movement.

(Step S75)

The normal movement process program P1c2 executes a process (a normal movement process) with respect to the input of the normal movement. The normal movement process moves, without performing pass movement of the character PC as in the above-mentioned special movement process, the character PC from the current position to a coordinate in the virtual three-dimensional space in accordance with the stroke amount and the direction that are input by the above-mentioned normal movement input signal. In the movement of this case, as mentioned above, as long as it is the region that is set to allow movement, the character PC can move in the virtual three-dimensional space independently of the path to which the current position is set and of the path region. For example, when a movement is made from within the region that is set to the current path (C) to the right direction, it is possible to move from the region of the path (C) to the region of the path (D). In this manner, it is also possible to reach the goal while avoiding the obstacles only by the normal movement as in a general action game that conventionally exists.

(Step S76)

The input signal analysis program P1c1 determines whether or not the operation input other than the input signal relating to the movement of the character PC is input from the controller pad 18. As a result of the determination, when the operation input signal other than the input signal relating to the movement of the character PC is input, advancement is made to the next step S77. When the operation input signal other than the input signal relating to the movement of the character PC is not input, advancement is made to step S78. It should be noted that the operation input signal other than the input signal refers to, for example, an input signal from the ○ button, the Δ button, or the like, which is arranged on the controller pad 18.

(Step S77)

A process corresponding to a selected operation input signal is performed. For example, when a jump operation (an input signal from the ○ button) is performed, an effect of operation is made such that the character PC kicks the ground and jumped into the air, and a jump action flag, which is set to the RAM 4, is set ON (for example, "1" is stored). Additionally, when there is an input such as an attack operation input (an input signal from the Δ button), similarly, an attack action flag, which is set to the RAM 4, is set ON.

(Step S78)

A status variation process is performed. The status variation process varies the state of the character PC in accordance with the above-mentioned jump action flag or attack action flag. For example, when the jump action flag is set ON, the player operates the controller pad 18, and as a jump action, performs an operation for increasing the speed in a sky direction (e.g., a positive direction of a Z axis) in the virtual three-dimensional space. The character PC, whose speed is increased in the sky direction by an acceleration operation by the player, flies in the air in response to the acceleration of gravity, and moves to a ground direction (a negative direction of the Z axis).

Additionally, when the attack action flag is set ON, in a case where, for example, a contact is made to other attacking target object while raising a fist, the player performs, as an attacking state, a process for carrying out an attack. When the process of step S78 is performed, the process of step S7 shown in FIG. 7 ends.

(Step S8) (Step S9)

The contact determination program P1b2 determines whether or not the character PC, which is moving in the path, contacts other object such as the obstacle j1 that is set to the path. The contact determination process determines that the character PC makes a contact, when, for example, a part of the current position coordinate of the character PC contacts or is included in three-dimensional space coordinates of an object that is set in the path. Then, when it is determined that the character PC contacts the other object, step S9 displays, on the display device 14, an effected image of contact that is stored in the graphic memory.

(Step S10) (Step S11)

The goal determination program P1b6 determines whether or not the character PC moving in the path that is set in the virtual three-dimensional space reaches the position coordinate of the goal that is set in the path. As a result of the determination, when it is determined that the character PC reaches the position coordinate of the goal, advancement is made to step S11, and an effected image of the goal stored in the graphic memory 11 is displayed on the display device 14 for a predetermined time. On the other hand, when it is determined that the position coordinate of the goal is not reached, a process for returning to step S5 is performed, and the player continues to play the game.

(Step S12)

The main control program Sib performs an end process of the stage. As for the end process of the stage, when, for example, the goal effect process is performed in step S11, the course is completed, i.e. the course is cleared, and a clear process is performed that stores, in the RAM 4, status information relating to the clear of the game or the like. Additionally, as for the stage end process, for example, when it is determined that the remaining time is "0" (time out) in the process of step S5, or when it is determined that "retire by mistake" is made in the process of step S6, i.e., when it is determined that the player fails to clear, for example, the number of times of challenging is decreased, and the status information is stored in the RAM 4 that indicates that challenge of the course of the stage cannot be cleared.

In the above-mentioned special movement process, a description is given of the case where, based on the operation input signal made by the player by pressing the push button L1 or R1, a control is performed that moves the character PC to the adjacent path. However, the special movement process may further include the following means. That is, when the player presses the push button L2, the character is moved to the two paths left from the path where the character is currently moving. On the other hand, when the player presses the push button R2, the character is moved to the two paths right from the path where the character is currently moving.

Further, in addition to the special movement process, with respect to an operation input other than the movement input (a simultaneous input of the jump button and the attack button), for example, the special movement process may be performed while making the character jump highly, or a process may be performed that moves the character to a destination while making an attack by the special movement process.

Additionally, in the present invention, the structures of the paths themselves in the three-dimensional space may be curved lines. For example, as for a structure where the course itself, to which the path is set, is curved and meandering to the left and right, the path may also be meandering to the left and right. In that case, the player may move the curved course at a high speed in accordance with vectors set in the path merely by pressing the lever 23 or 24 forward, and the character may be moved to an adjacent curved path in accordance with the special input operation.

Further, the structures of the paths themselves may be three dimensional. For example, a plurality of paths may form a three-dimensional structure, and may be twisted like a double helix. In this case, when two paths are formed by a path A and a path B, the path region that allows movement in each of the paths is formed by a twisted curved surface including the path A·the path B. When the path A is located on the right side at a certain spot, it is possible to move the character to the path B with the push button L1, and when the path A is located on the left side at a certain spot, it is possible to move the character to the path B with the push button R1. Hence, it is possible to provide a more complex structure of the paths.

The invention claimed is:

1. A game machine including game control means for controlling, based on an operation input signal from input operation means operated by a player, a character to move along a path that is set in a virtual three-dimensional space, the path being formed by a plurality of paths that are set in parallel in the virtual three-dimensional space, the plurality of paths being further set to include portions from which the paths branch off or at which the paths meet, so as to increase or decrease the number of paths, the input operation means including a first input operation part for generating a normal movement input signal and a second input operation part for generating a special movement input signal, wherein the normal movement input signal includes an analog value for a direction of movement and an analog value for a movement amount of the character, and the special movement input signal includes an execution instruction for the special movement process;

the game control means comprising:

path information storing means for storing a position coordinate and a directional vector that are given to each point of a sequence of points arranged in each of the paths;

character position coordinate storing means for calculating, based on the position coordinate and the directional vector stored in the path information storing means, a position coordinate of the character moving in one of the paths, and for storing the position coordinate;

normal movement process means for moving the character along one of the paths based on the normal movement input signal; and, special movement process means for moving, based on the special movement input signal, a position of the character moving in the one path to a position coordinate in the virtual three-dimensional space of a path adjacent to the one path where the character is moving, while maintaining the current movement speed of the character, by referring to position coordinates of the sequence of points stored in the path information storing means.

2. The game machine according to claim 1, wherein the special movement input signal includes a direction type signal for moving the character moving in the one path to one of adjacent paths that are set in parallel to the one path, and the special movement process means includes means for moving, based on the direction type signal, the position of the character moving in the one path to a position coordinate in a path that is set to right adjacent or left adjacent to the one path.

3. The game machine according to claim 1, wherein the normal movement process means moves the position of the character moving in the one path to a position coordinate in the virtual three-dimensional space calculated based on the analog values for the direction of movement and the movement amount.

4. A movement control method of a character for controlling a movement of the character in a virtual three-dimensional space in a game, the game including:

game control means for controlling, based on an operation input signal that is input from input operation means operated by a player, an operation of a game machine that moves a character along one of a plurality of paths that are set in a virtual three-dimensional space, the plurality of paths being further set to include portions from which the paths branch off or at which the paths meet, so as to increase or decrease the number of paths, the input operation means including a first input operation part for generating a normal movement input signal and a second input operation part for generating a special movement input signal, wherein the normal movement input signal includes an analog value for a direction of movement and an analog value for a movement amount of the character, and the special movement input signal includes an execution instruction for the special movement process;

character position coordinate storing means for storing a position coordinate of the character moving in one of the paths; and path information storing means for storing a position coordinate and a directional vector that are given to each point of a sequence of points arranged in each of the paths in the game, the movement control method of the character comprising:

an input signal analysis step for, when the operation input signal is input from the input operation means, analyzing a type of the input operation input signal;

a normal movement process step for moving, based on the normal movement input signal analyzed by the input signal analysis step, the character along one of the paths based on the normal movement input signal; and, a special movement process step for moving, based on the special movement input signal analyzed by the input signal analysis step, a position of the character moving in the one path to a position coordinate in the virtual three-dimensional space of a path adjacent to the one path where the character is moving, while maintaining the speed of the character, by referring to position coordinates of the sequence of points stored in the path information storing means.

5. The movement control method of the character according to claim 4, wherein, when the input signal analysis step analyzes that the special movement input signal is a direction type signal for moving the character moving in the one path to one of adjacent paths that are set in parallel to the path, the special movement process step includes a step for moving, based on the direction type signal, the position of the character moving in the one path to a position coordinate in the virtual three-dimensional space of a path that is right adjacent or left adjacent to the one path.

6. The movement control method of the character according to claim 4, wherein the normal movement process step moves the position of the character moving in the one path to a position coordinate in the virtual three-dimensional space which is calculated based on the analog values for the direction of movement and the movement amount.

* * * * *